United States Patent
Jarisch et al.

(10) Patent No.: US 6,854,378 B2
(45) Date of Patent: Feb. 15, 2005

(54) DEVICE AND METHOD FOR IMPROVING THE EXTRACTION OF A FOOD SUBSTANCE CONTAINED IN A REFILL

(75) Inventors: Christian Jarisch, Romanshorn (CH); Alexandre Kollep, Lutry (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/424,736

(22) Filed: Apr. 29, 2003

(65) Prior Publication Data

US 2003/0217644 A1 Nov. 27, 2003

Related U.S. Application Data

(63) Continuation of application No. PCT/EP01/11486, filed on Oct. 4, 2001.

(30) Foreign Application Priority Data

Nov. 3, 2000 (EP) .............................................. 00203855

(51) Int. Cl.⁷ ................................................ A47J 31/40
(52) U.S. Cl. ........................ 99/295; 99/302 R; 426/433
(58) Field of Search ............................... 99/295, 302 R, 99/300, 307, 323.3; 426/433, 435

(56) References Cited

U.S. PATENT DOCUMENTS

| | | | |
|---|---|---|---|
| 4,136,202 A | 1/1979 | Favre .......................... 426/77 |
| 5,398,595 A * | 3/1995 | Fond et al. .................... 99/295 |
| 5,649,472 A | 7/1997 | Fond et al. .................... 99/295 |
| 5,762,987 A * | 6/1998 | Fond et al. .................. 426/433 |
| 5,794,519 A | 8/1998 | Fischer ......................... 99/295 |
| 5,826,492 A | 10/1998 | Fond et al. .................... 99/295 |
| 5,897,899 A | 4/1999 | Fond .......................... 426/112 |
| 6,025,000 A | 2/2000 | Fond et al. .................. 426/433 |
| 6,026,732 A | 2/2000 | Kollep et al. .................. 99/295 |
| 6,068,871 A | 5/2000 | Fond et al. .................. 426/433 |
| 2002/0121198 A1 | 9/2002 | Kollep et al. .................. 99/279 |

* cited by examiner

Primary Examiner—Reginald L. Alexander
(74) Attorney, Agent, or Firm—Winston & Strawn LLP

(57) ABSTRACT

The invention relates to a device for extracting a food substance contained in a closed refill. The device includes a hollow body with a housing for accommodating the refill, a water inlet channel passing through the body and communicating with the housing, and a plurality of piercing elements arranged in the housing for piercing the refill in several different places in order to allow the water to pass through the refill. The piercing elements are spaced apart in the housing with respect to the water inlet direction in the housing. Each piercing element includes: (i) a base portion secured to the body and projecting into the housing, designed to engage at least partially inside the refill, and (ii) a cutting surface which intersects the base portion at an acute angle.

15 Claims, 3 Drawing Sheets

US 6,854,378 B2

DEVICE AND METHOD FOR IMPROVING THE EXTRACTION OF A FOOD SUBSTANCE CONTAINED IN A REFILL

CROSS-REFERENCE TO RELATED APPLICATION

This application is a continuation of the US national stage of International Application No. PCT/EP01/11486, filed Oct. 4, 2001, the entire content of which is expressly incorporated herein by reference thereto.

FIELD OF INVENTION

The invention relates to a device for extracting a food substance for making drinks using a closed refill filled with the food substance and through which a stream of pressurized water passes.

BACKGROUND OF THE INVENTION

The use of predetermined and prepackaged doses in the form of refills containing ground coffee for preparing espresso type or similar drinks has many advantages, including those of facilitating the operations of preparing the drink, of ensuring a relatively clean preparation and of controlling a relatively constant dose and quality of the prepared product.

The principle of extraction from closed or sealed refills includes: (i) enclosing the refill in a sealed chamber, (ii) piercing one face of the refill, (iii) introducing a quantity of hot water into the refill so as to create a pressurized environment inside the refill in order to produce the coffee extract, (iv) then releasing the coffee extract through the opposite face of the refill which, in contact with projecting parts of the device, opens under the effect of the internal pressure.

There are already devices for extraction from capsules or cartridges, comprising a housing for the cartridge to be extracted and a point such as those described in U.S. Pat. Nos. 4,136,202 and 6,026,732. In these devices, the point has a dual function. On the one hand, it opens the upper part of the capsule and, on the other hand, it forms the inlet channel for water in the sense that the water is directly introduced inside the capsule through the point itself. One drawback of such a device arises in that the hole obtained by a single needle has the effect of creating, at the beginning of the extraction, a preferred pathway through the mass of coffee to be extracted without completely wetting it. The consequence of creating a preferred pathway is that when the extraction takes place, the rate at which the pressure rises becomes too high, which may lead to releasing the extract too early such that not enough extraction time is obtained. Of course, the consequence may be a loss of solids and flavors which then remain fixed in the grounds and are therefore not transferred to the extract. Another drawback arises in that the point tends to get blocked quickly because of the scale in the water or contact with the grounds, which may affect the performance of the device. Given the large size of the hole made in the capsule, the capsule is also subject to undesirable rise of the grounds and the liquid residue after use.

U.S. Pat. Nos. 5,649,472, 5,762,987, and 5,826,492 also relate to devices which have means of perforating a flexible sachet containing the product to be extracted, which is in the form of a grid for distributing water provided on its lower face with elements having projecting points, blades, or crosses. Orifices may be provided for the passage of water through the distribution grid at each perforating means. Thus, an improvement in the water distribution in the sachet is provided which makes it possible to improve the wetting of the mass to be extracted. The orifices with a closed section can, however, fur up over time with which affects the control of the flow rate and pressure during the extraction.

U.S. Pat. No. 5,794,519 relates to an extraction device comprising an extraction head which supports movable needles by means of an ejector which ejects the capsule from the needles by means of a spring when the extraction head is in the open position. Such a construction is relatively complex. Furthermore, it requires providing openings with a closed section for the passage of water either through the plate supporting the needles or through the needles themselves, which leads to problems of reduction of the orifices, and blocking or furring up on intensive use of a device. Over time, the flow rates, the through pathways, the volume of water, and other parameters relating to the extraction conditions, in particular the extraction pressure, the extraction time, and the temperature, undergo significant alterations which impair the quality of the extract produced.

Thus, improved devices for extracting foodstuffs are needed, and these are now provided by the present invention.

SUMMARY OF THE INVENTION

The invention relates to an improved device for extracting a food substance contained in a closed refill. This device comprises a hollow body provided with a housing for accommodating the refill; a water inlet channel passing through the body and communicating with the housing; and a plurality of piercing elements arranged in the housing for piercing the refill in several different places in order to allow the water to pass through the refill. Advantageously, these piercing elements are spaced apart in the housing with respect to the water inlet direction in the housing. Each piercing element preferably comprises a base portion secured to the body and projecting into the housing, the base portion being designed to engage at least partially inside the refill so as to form a passage of water inside the capsule, the base portion forming a solid element and having a closed cross section; and a cutting surface which intersects the base portion at an acute angle.

The invention also relates to a method of extracting a food substance contained in a refill by piercing the refill in several different places so as to allow a pressurized fluid, such as water, to pass through the refill. The piercing is carried out by cutting using a cutting portion of the piercing element at several different places in the refill and by creating, at each place, a temporary flow surface between a base portion of the piercing element and the cut opening.

BRIEF DESCRIPTION OF THE DRAWINGS

The invention will be better understood in relation to the attached drawings illustrating preferred embodiments, wherein.

DETAILED DESCRIPTION OF THE INVENTION

Figure 1:
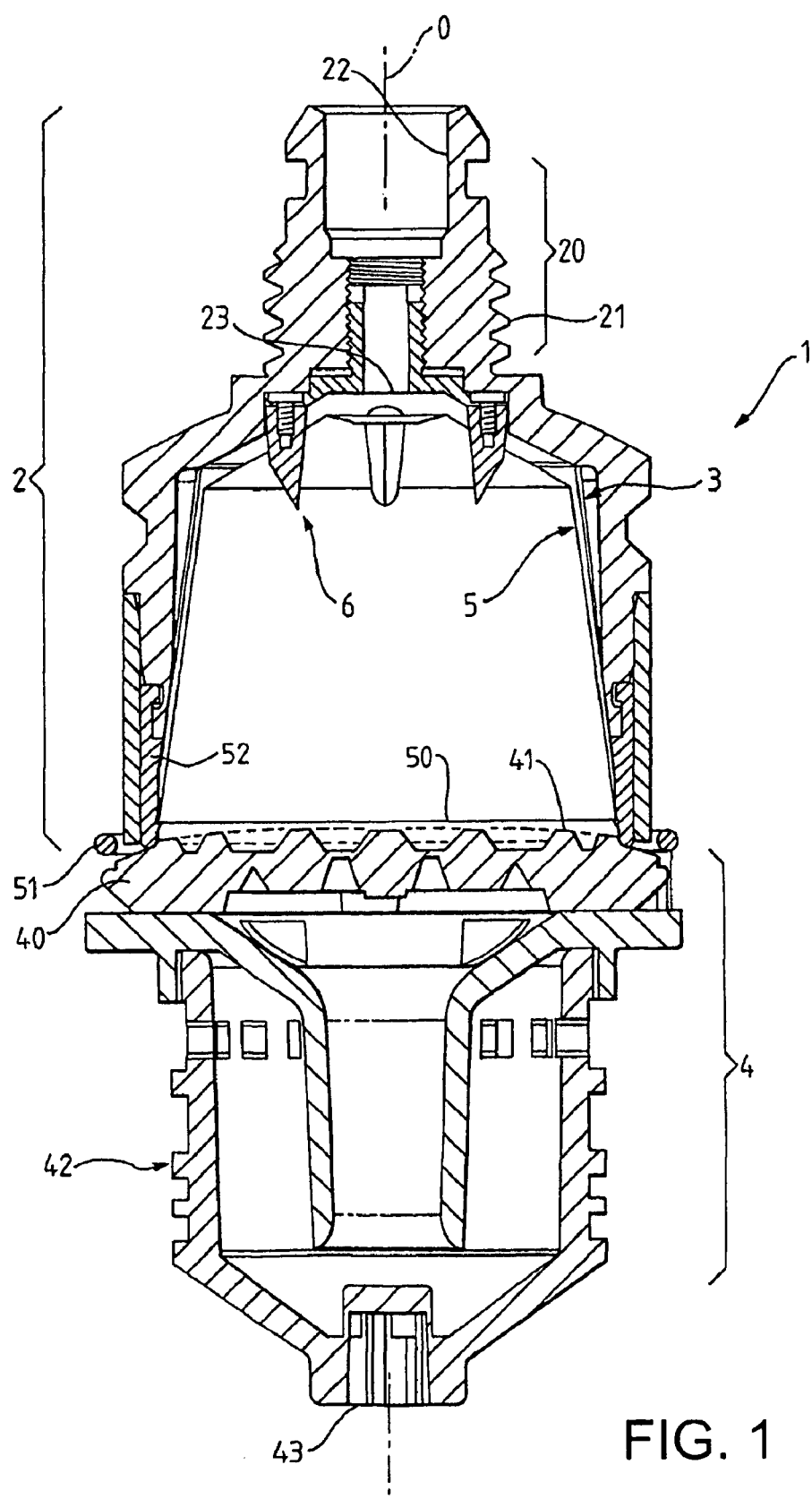
FIG. 1 shows an exploded view of an extraction device according to a preferred embodiment of the invention.

The present invention aims to improve the design of elements that are used for piercing a closed capsule, sachet, or similar type refill. These improved elements enhance the flow conditions of the water inside the refill and improves the conditions for extraction. More specifically, the invention aims to improve the spraying of water through the substance to be extracted by avoiding preferred pathways and by providing a relatively slow pressure rise inside the refill in order to optimize the capture of the flavors. The invention also removes the risk of reducing the flow because of obstructions formed by scale deposit or the like, by providing a constant flow over time, independent of the obstruction factors. It enhances the release of the capsule from the piercing means by avoiding using forced ejection systems. The invention also provides a piercing, more specifically a cutting, which provides a flow of water which is relatively reproducible from one refill to another which takes account of variations due to dimensional tolerances between the housing of the device and the refills. The invention also aims to limit the rise of liquid or solid residue outside the refill after extraction. The invention also provides a cleaner opening by the piercing elements without a risk of detaching material from the wall of the refill.

To do this, the device according to the invention comprises a hollow body for accommodating the refill, a water inlet channel passing through the body and communicating with the housing, and a plurality of piercing elements arranged in the housing for piercing the refill in several different places in order to allow the water to pass through the refill. In a preferred embodiment, the piercing elements may be spaced apart in the housing with respect to the water inlet direction. Furthermore, each piercing element comprises a base portion which is secured to the body and projects into the housing. The base portion is designed to engage at least partially inside the refill so as to form a flow surface for the water. The base portion is intersected by a cutting surface at an acute angle forming a beveled cutting portion. The base portion is also without a flow channel having a closed section which can easily be obstructed by grounds or fur. On the contrary, the flow inside the capsule takes place mainly through a space owing to the clearance that forms between the surface of the base portion and the opening cut in this way. Such a space is therefore temporary since it is created only by the cutting or piercing as the refill is put in place in the housing. Thus, the formation of residues, which may alter the flow conditions, is reduced or avoided.

Such a configuration of the piercing elements also has the effect of improving wetting of the substance to be extracted by reducing the preferred pathways, allowing a slower pressure rise inside the refill and, therefore, improving the quality of the liquid extract obtained. More specifically, the cuts are thus made with better definition and better geometry of the openings. In particular, openings are obtained that are closer together around the piercing elements. This has the consequence that, initially, the water flows more slowly through the refill thereby avoiding the formation of preferred pathways, and also, the consequent rise in pressure takes place more slowly. Unlike a single point, the piercing element according to the invention does not create a foldover of material over the entire opening, which tends to enlarge it, but on the contrary, the piercing element cuts cleanly and releases the cut material only on the side of the cutting surface, thus producing an improved definition of the opening and, therefore, a beneficial effect on the rate at which the internal pressure rises.

Preferably, to obtain openings having good definition, the cutting surface of the piercing element forms a cutting angle of about 10° to 50°, more preferably about 15° to 45°, with respect to the longitudinal direction of the base portion.

Preferably, the base portion has a cross section which gradually decreases in the direction of the cutting surface at an angle smaller than the angle of the cutting surface. This makes it possible for the enlargement of the opening to be more accurately controlled, and thus, to ensure that the material remains as close as possible to the base portion as the piercing element is gradually introduced into the refill, then guaranteeing a slower pressure rise and, therefore, a better quality extraction. Because of the fit between the capsule and the piercing elements, the decreasing shape of the base portion also ensures easier retraction of the capsule after the extraction and avoids using an ejection device.

The base portion may be any shape known to those of ordinary skill in the art. Preferably, the base portion has a cross section such that the ratio of its largest dimension to its narrowest dimension is about 2/1 to 1/1, so as to produce localized openings in the form of holes rather than notches. Thus, the base portion may have a cross section of circular, ellipsoidal, rectangular, square, triangular, or other regular or irregular polygonal shape.

Preferably, the base portion forms a cone portion with an angle of about 1° to 10°, more preferably about 3° to 5°, which is intersected by the cutting surface. Thus, the opening is enlarged in a gradual and controlled manner around the piercing element and the risk of tearing is decreased.

The orientation of the piercing element, and especially its cutting surface, in the housing is of importance to the cleanness of the cut. Thus, the piercing elements are preferably oriented in the housing so as to present their cutting surfaces respectively at an angle close or equal to 90° with respect to the surface of the refill to be cut when the latter is engaged in the housing. In other words, the angle of attack is oriented so as to be a maximum to promote a higher-performance cut.

Of course, the nature and the geometry of the refill may be variable. In general, the body of the device has a housing of shape and dimensions suitable for accommodating one or more types of refill. The refill may be a rigid, semi-rigid, or flexible element comprising a substance to be extracted which may or may not be in compacted form. By way of example, the type of refill is a leak-tight, sealed capsule or cartridge, comprising a dish substantially in the shape of a truncated cone and a lower face forming a lid sealed on the lower edge of the dish like the one forming the subject of U.S. Pat. No. 5,897,899, whose content is incorporated herein by reference. According to another possible variation, it may involve a flexible sachet formed from two flexible sheets welded together over their perimeters and comprising a compacted portion of substance to be extracted. Such a sachet configuration is described in U.S. Pat. Nos. 6,025,000 and 6,068,871, which are each incorporated herein by reference.

The body of the device for receiving the refill according to the invention may be part of a complete assembly of an espresso type coffee machine or the like. The body may be an integral part of the device or be a part attached by screws or other means. The body is, in general, commonly called a "capsule cage". Generally, the body of the device cooperates on closing with a complementary lower closure part. The lower closure part comprises means for breaking the flow of the extract produced during the extraction operation in the lower part of the refill. According to the invention, the body and the lower closure part cooperates on closure on hinges which can move in a direction substantially corresponding to the direction of the piercing elements in the housing so as to avoid any risk of tearing the refill. A device with movable hinge or jaw of this type is described in U.S. Pat. Nos. 5,649,472, 5,762,987, or 5,826,492, or U.S. Application Publication No. 2002/0121198, the contents each of which are incorporated herein by reference.

As used herein, the term "capsule" may be used to denote the refill. The refill or capsule may include, however, any type of rigid, semi-rigid, or flexible refill.

With reference to FIG. 1, the extraction device 1 according to the invention is in the form of an extraction assembly capable of accommodating a refill 5, in this instance in the example illustrated, a semi-rigid capsule containing a substance to be extracted, such as a pre-dosed quantity of ground and roasted coffee. More specifically, the extraction assembly comprises a capsule cage forming a hollow body 2 provided with a housing 3, and a lower support 4 capable of cooperating with the capsule cage 2 when closed around the refill 5. The capsule cage 2 and the lower support 4 may be closed by any suitable mechanical means, but preferably, by relative mobility in a substantially vertical, straight, or slightly curved direction, of trajectory O. By way of example, the lower support 4 may be static in the direction O in order to accommodate the refill 5 and the capsule cage may be movable in the direction O in the closed position. Alternatively, the lower support could also be provided so that it can move along O, the capsule cage being fixed or else movable along O.

The capsule cage 2 is extended upwards by an upper portion 20 having connection means 21, such as an external thread enabling connection to a hot-water supply. The upper portion 20 has an internal bore 22 for the passage of water, which communicates with the housing 3 of the hollow body at a water outlet 23.

The lower support 4 comprises a distribution plate 40 for accommodating the base of the capsule, which generally includes a flexible sheet 50. The distribution plate comprises, distributed over its inner surface, relief elements 41 designed to cause the opening by multiple tearing of the flexible sheet under the effect of the extraction pressure inside the capsule. A subassembly 42 is provided downstream of the distribution plate, for flow of the liquid extract obtained, after the base of the capsule is broken, and ends in an outlet orifice 43.

The refill has a sealed peripheral edge 51 gripped between the capsule cage 2 and the lower support 4. The gripping closure is achieved in a sealed manner by contact between the edges of the cage and the support. Sealing means for the cage, such as an elastomer ring 52, may be provided to ensure a firm and elastic grip between the parts in contact, thus avoiding any risk of leakage when the housing is pressurized. The mechanical means closing the assembly and holding it in position are not illustrated here. This may, for example, involve an articulated type lever with manual or motorized control.

Figure 2:
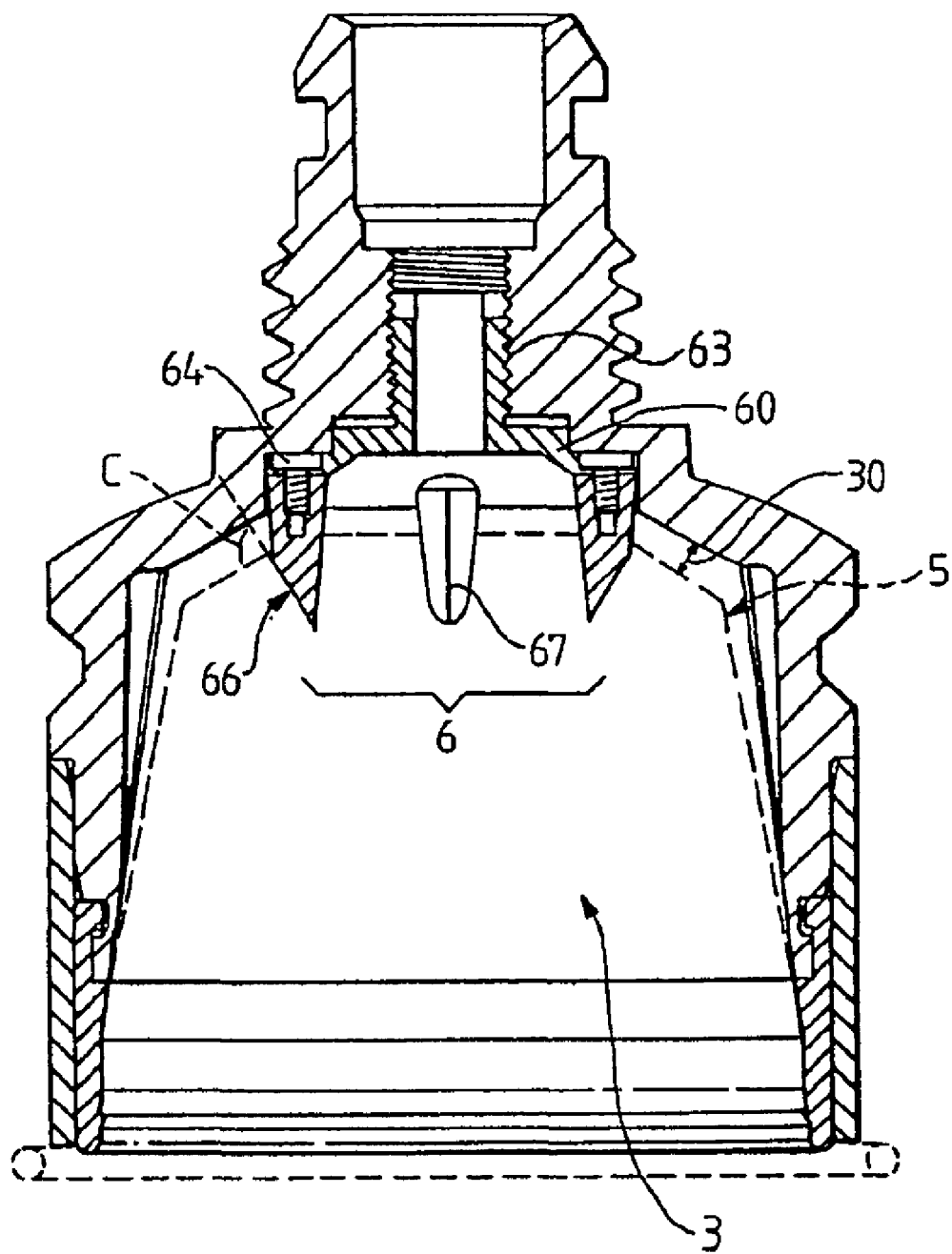
FIG. 2 shows a sectional view more particularly of the piercing and water-supply device according to the invention.

As shown more specifically in FIG. 2, a series of piercing elements 6 is provided at the bottom of the housing 3 in order to cut the top of the capsule with a plurality of holes and to allow water to pass through the capsule. The piercing elements 6 are regularly distributed around the central water inlet and project towards the inside of the housing in a direction substantially parallel to the direction in which the capsule engages in the housing. Preferably, the elements are mounted securely to a common mounting support 60 allowing fast mounting inside the housing. The mounting support may include a hollow rod portion 62 having an external thread 63, which is screwed into a complementary threaded portion of the water inlet channel. The piercing elements may be mounted by screws 64 on the support 60. Alternatively, the piercing element could be welded to the support or form an integral part of the support.

Figure 3:
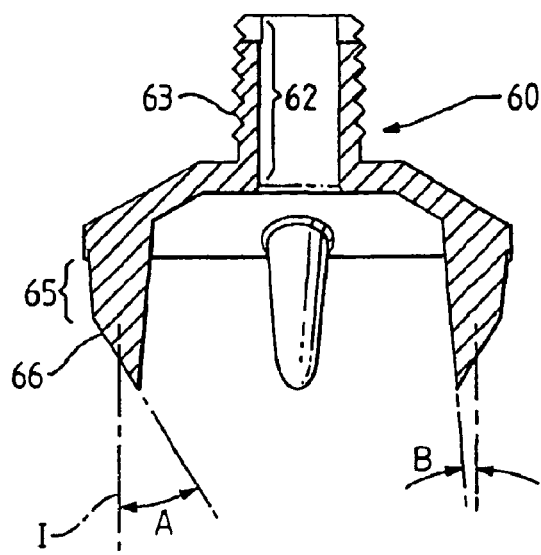
FIG. 3 shows, in cross-section, a preferred arrangement of the piercing elements secured to a mounting support.
Figure 4:
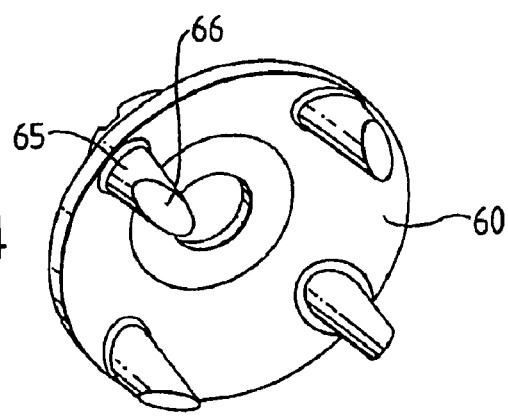
FIG. 4 is a perspective view of FIG. 3.
Figure 5:
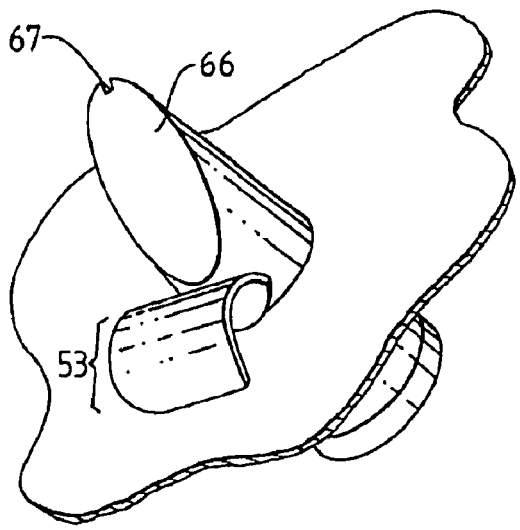
FIG. 5 shows the principle of cutting using a piercing element of the invention.

As shown in FIG. 3, each piercing element 6 comprises a base portion 65 oriented in a longitudinal direction I corresponding to the direction of engagement of the refill. The base portion is interrupted by an inclined surface 66 which forms the cutting surface of the element. The angle of inclination A of the cutting surface with respect to the direction I is preferably about 10° to 50°, more preferably about 15° to 45°. The surface 66 mainly has a cutting function as illustrated in FIG. 5 with the advantageous effect that the sliver of material 53 is cleanly cut and is released in one piece on the side on the beveled part 66. Thus, tearing as with a point is avoided, where the material tends to move away in several directions creating tear lines over the perimeter of the hole.

The base portion may advantageously be a cone portion with a cross section tapered in the direction of the cutting surface. Such a shape is advantageous since it makes it possible to keep a minimum clearance between the surface of the base portion and the edge of the hole. Thus, a too sudden re-entrance of water is prevented, which would have the consequence of creating preferred pathways through the mass to be extracted and therefore, consequently, generate too rapid an increase in pressure. Such a clearance is also temporarily created for the duration of the extraction. Thus, any deposit of residues on the surfaces is avoided. The surface of the base portion is scraped by the capsule surface on entry and exit of the piercing element, which provides constant cleaning of the flow surface and removes any possible deposit. From one capsule to another, the piercing conditions remain identical as do the flow conditions. A truncated cone shape of this sort is also advantageous compared to a shape with a constant cross-section, in particular when the device is closed in a substantially arced trajectory as shown in FIG. 1 in that a constant cross section would have the effect of widening the hole on the outside of the curve, and therefore of creating an undesirable clearance.

In the example illustrated, the refill expands relatively little during pressurization such that a passage 30 is maintained between the wall of the housing and the wall of the refill 5. Thus, the base portion 65 has to be long enough, about 2 to 15 mm, that when the refill is engaged in position with the housing, the cutting surface 66 is positioned completely inside the refill chamber, and this while taking account of the possible variations of the passage thickness due to the dimensional tolerances between the housing and the refill.

As shown in FIG. 2, each piercing element is individually oriented in the housing such that its cutting surface 66 makes an angle of 90°±5° to the surface to be cut. Thus, better cutting and less wear of the cutting surface is obtained.

The piercing elements may be made of a suitable hard and wear-resistant material. The material is chosen depending on the material of the capsule or sachet to be cut. In general, the capsules are made of thin aluminium or of plastic with a thickness of 0.2 to 1.5 tenths of a millimeter such that the piercing elements may be made of metal, preferably, hard-layer anodized aluminium or stainless steel, or of ceramic or hard plastic.

The number of piercing elements may, of course, vary according to the size of the refills. Enough of them are needed in order to correctly distribute water through the mass without, however, weakening the wall of the refill too much, which could then break and thus soil the housing. Thus, the number of piercing elements is preferably about 3 to 10, more preferably about 4 to 6. The number of piercing elements depends on the cross section of the elements. Too great a number of elements with a large cross section tends to create deformations in the surface of the capsule, damaging the latter. The largest transverse dimension of the base portion (for example, its diameter for a portion of circular cross section) is preferably less than about 3 mm, more preferably about 1 to 2.5 mm. For a base of about 2.4 to 2.5 mm, the number of elements should not exceed 3 or 4. On the other hand, for a base of about 1 to 2 mm, the number of elements may go up to 6, or even 8, without significant deformation of the capsule, thereby guaranteeing optimum extraction conditions (time, pressure, temperature).

In a possible configuration, each piercing element may be provided with an open groove 67 longitudinally distributed along the surface of the base portion making it possible to refine the water flow in a controlled way. The groove is preferably placed on the side of the end of the cutting surface such that the surface is sufficiently free.

In the example shown, the method for extracting a liquid is as follows. The device is in the open position and a capsule 5 is placed on the relief surface of the lower support 4. The device is reclosed by applying the edges of the cage 2 and of the support 4 so as to pinch the sealing edge 51 of the capsule. On closure, the upper surface of the capsule is cut by the piercing elements 6. In this position, a significant part of the base portion of each element is inserted into the capsule so as to offer a flow surface during the extraction time. The hot water runs into the housing via the exit 23 and is distributed in the passage 30, it then flows slowly between the surface of the piercing elements and the cut edges of the openings. As the water gradually enters, the pressure inside the capsule slowly increases which tends to slightly dilate the holes in a uniform manner around each element. The pressure for tearing the base of the capsule reaches about 7 to 9 bars in a few seconds. The tensile force for breaking the sheet of the capsule is then reached, and the extracted liquid can be removed through the flow part 42 and through the hole 43.

The invention has been described by way of preferred example in relation to a device for extraction from semi-rigid capsules having a limited deformability. It should, however, be understood that the invention is nevertheless applicable for extraction from flexible refills of the sachet type comprising a compacted mass of an extractable food substance.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A device for extracting a food substance contained in a closed refill, comprising:
   a hollow body provided with a housing for accommodating the refill;
   a water inlet channel passing through the body and communicating with the housing;
   a plurality of piercing elements arranged in the housing for piercing the refill in several different places in order to allow the water to pass through the refill, wherein the piercing elements are spaced apart in the housing with respect to the water inlet direction in the housing, and wherein each piercing element comprises:
      a base portion secured to the body and projecting into the housing, the base portion being designed to engage at least partially inside the refill so as to form a passage of water inside the capsule, the base portion forming a solid element and having a closed cross section; and a cutting surface which intersects the base portion at an acute angle, with the cutting surface formed of a beveled surface that is configured to cut and release a sliver of material in substantially one piece.

2. The device of claim 1, wherein the cutting surface forms a cutting angle of about 10° to 50° with respect to the longitudinal direction of the engaging surface of the base portion.

3. The device of claim 1, wherein the base portion has a circular, ellipsoidal, regular, or irregular polygonal cross section.

4. The device of claim 1, wherein the piercing elements are oriented in the housing such that the cutting surface is at an angle of about 90° with respect to the surface of the refill to be cut when the refill is within the housing.

5. The device of claim 1, wherein the water inlet channel is located substantially in the center of the housing and the piercing elements are distributed at regular intervals around the inlet channel.

6. The device of claim 1, comprising about 3 to 10 piercing elements.

7. The device of claim 1, wherein the base portion has a transverse dimension of less than about 3 mm.

8. A device for extracting a food substance contained in a closed refill, comprising:
   a hollow body provided with a housing for accommodating the refill;
   a water inlet channel passing through the body and communicating with the housing;
   a plurality of piercing elements arranged in the housing for piercing the refill in several different places in order to allow the water to pass through the refill, wherein the piercing elements are spaced apart in the housing with respect to the water inlet direction in the housing, and wherein each piercing element comprises:
      a base portion secured to the body and projecting into the housing, the base portion being designed to engage at least partially inside the refill so as to form a passage of water inside the capsule, the base portion forming a solid element and having a closed cross section; and a cutting surface which intersects the base portion at an acute angle, wherein the base portion has a cross section which is tapered in the direction of the cutting surface at an angle smaller than the angle of the cutting surface.

9. A device for extracting a food substance contained in a closed refill, comprising:
   a hollow body provided with a housing for accommodating the refill;
   a water inlet channel passing through the body and communicating with the housing;
   a plurality of piercing elements arranged in the housing for piercing the refill in several different places in order to allow the water to pass through the refill, wherein the piercing elements are spaced apart in the housing with respect to the water inlet direction in the housing, and wherein each piercing element comprises:

a base portion secured to the body and protecting into the housing, the base portion being designed to engage at least partially inside the refill so as to form a passage of water inside the capsule, the base portion forming a solid element and having a closed cross section; and a cutting surface which intersects the base portion at an acute angle, and wherein the base portion is in the form of a cone having an angle of about 1° to 10°.

10. A device for extracting a food substance contained in a closed refill, comprising:

a hollow body provided with a housing for accommodating the refill;

a water inlet channel passing through the body and communicating with the housing;

a plurality of piercing elements arranged in the housing for piercing the refill in several different places in order to allow the water to pass through the refill, wherein the piercing elements are spaced apart in the housing with respect to the water inlet direction in the housing, and wherein each piercing element comprises:

a base portion secured to the body and projecting into the housing, the base portion being designed to engage at least partially inside the refill so as to form a passage of water inside the capsule, the base portion forming a solid element and having a closed cross section; and a cutting surface which intersects the base portion at an acute angle, wherein the base portion comprises, on its outer surface, at least one open groove oriented longitudinally in order to facilitate introduction of water into the refill.

11. A method of extracting a food substance from a refill containing same, which comprises: piercing the refill in a plurality of places to create a temporary flow surface; wherein the piercing step is effected by a base portion and a cutting surface which intersects the base portion at an acute angle, and further wherein the cutting surface is formed from a beveled surface that is configured to cut and release a sliver of material in substantially one piece; and flowing a pressurized fluid through the refill to allow the food substance to flow through the temporary flow surface.

12. The method of claim 11, wherein the refill is made of a plastic material or aluminum and wherein the refill is pierced at one time by a series of piercing elements to provide holes in the refill that allow the pressurized fluid to pass therethrough.

13. The method of claim 12, wherein the fluid is water and the piercing elements are distributed around a central water inlet and project towards the refill in a substantially parallel direction.

14. The method of claim 13, wherein each piercing element includes a base portion designed to engage at least partially inside the refill so as to form a passage of water inside the capsule, the base portion forming a solid element and having a closed cross section; and a cutting surface which intersects the base portion at an acute angle.

15. The method of claim 14 wherein the base portion has a cross section which gradually decreases in the direction of cutting to ensure easy retraction of the refill capsule after extraction.

* * * * *